US010554625B2

(12) United States Patent
Al-Khabbaz

(10) Patent No.: US 10,554,625 B2
(45) Date of Patent: *Feb. 4, 2020

(54) INTEGRATED PCS FUNCTIONAL COMPETENCY ASSESSMENT

(71) Applicant: Saudi Arabian Oil Company, Dhahran (SA)

(72) Inventor: Fouad M. Al-Khabbaz, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,062

(22) Filed: Jun. 29, 2018

(65) Prior Publication Data
US 2018/0324150 A1 Nov. 8, 2018

Related U.S. Application Data

(63) Continuation-in-part of application No. 13/877,310, filed as application No. PCT/US2011/053991 on Sep. 29, 2011, now Pat. No. 10,038,670.

(60) Provisional application No. 61/388,540, filed on Sep. 30, 2010.

(51) Int. Cl.
*G06F 15/16* (2006.01)
*H04L 29/06* (2006.01)
*H04L 29/08* (2006.01)

(52) U.S. Cl.
CPC ...... *H04L 63/0281* (2013.01); *H04L 63/0236* (2013.01); *H04L 63/20* (2013.01); *H04L 67/12* (2013.01); *H04L 67/36* (2013.01)

(58) Field of Classification Search
CPC ............... H04L 29/08072; H04L 29/06; H04L 43/0817; H04L 63/0209
USPC .......................... 709/203, 220, 224, 226, 228
See application file for complete search history.

(56) References Cited

U.S. PATENT DOCUMENTS

| 7,546,253 | B2* | 6/2009 | Andersson | G06Q 10/0637 705/7.38 |
| 7,614,083 | B2* | 11/2009 | Khuti | H04L 63/02 726/22 |
| 7,761,923 | B2* | 7/2010 | Khuti | H04L 63/02 726/11 |
| 10,038,670 | B2* | 7/2018 | Al-Khabbaz | H04L 63/0209 |
| 10,225,597 | B2* | 3/2019 | Bradley | H04N 21/4122 |
| 2002/0087419 | A1* | 7/2002 | Andersson | G06Q 10/0637 705/7.36 |
| 2005/0273395 | A1* | 12/2005 | Andersson | G06Q 10/0637 705/305 |
| 2013/0215833 | A1* | 8/2013 | Ong | H04L 43/0817 370/329 |
| 2014/0101708 | A1* | 4/2014 | Bradley | H04N 21/4122 725/95 |

* cited by examiner

*Primary Examiner* — Khanh Q Dinh
(74) *Attorney, Agent, or Firm* — Abelman, Frayne & Schwab

(57) ABSTRACT

A system and method for centrally controlling access by computers in a corporate network to a plant network that runs plant applications, and for gauging Process Control System (PCS) Functional Specification competency. This system and method will help ensure that the corporate network and plant networks are operating according to a predetermined corporate-level engineering baseline that sets the minimum "functional" parameters for the networks to meet a business target or objective.

7 Claims, 15 Drawing Sheets

INTEGRATED PCS FUNCTIONAL COMPETENCY ASSESSMENT

CROSS REFERENCE TO RELATED APPLICATIONS

This application is a Continuation-in-Part of U.S. patent application Ser. No. 13/877,310, filed Aug. 12, 2013, which is a national phase entry of PCT/US11/53991 filed Sep. 29, 2011, which claims priority under 35 U.S.C. § 119(e) to U.S. Provisional Application No. 61/388,540, filed on Sep. 30, 2010, all of which are incorporated herein by reference.

FIELD OF THE INVENTION

The present invention relates to access management systems, more particularly to a system and method for managing access to a plant network (i.e., a collection of process control networks) that monitors and controls plant data. The present invention especially relates to gauging process control system Functional Specification competency.

BACKGROUND OF THE INVENTION

Generally, a company in industrial production operates two computer systems/networks: a corporate network 2 and a plant network 4 as shown in FIG. 1.

A corporate network 2 includes a group of computers that are connected together which are used to manage the company's operations such as management, sales, engineering and human resources, but excludes industrial production.

On the other hand, a plant network 4 ties together a number of process control networks, which are mission-critical networks that connect field instruments such as sensors, motor-operated valves (MOVs), and controllers. These process control networks are tied together as part of an automation system, of which there are several types of control systems that are used in industrial production, including supervisory control and data acquisition (SCADA) systems, distributed control systems (DCS), Process Automation Network (PAN), Distributed Control Systems (DCS), Emergency Shutdown Systems (ESD), Terminal Management Systems (TMS), networked electronic sensing systems, Power Monitoring System (PMS), Vibration Monitoring systems (VMS) and other smaller control system configurations such as programmable logic controllers (PLC) and remote terminal units (RTU).

As shown in FIG. 1, the corporate network 2 is separated from the plant network 4 by a filtering device 28 to prevent unauthorized access. Typically, a filtering device includes a data diode, a firewall device, or any other application security gateway, which may be a part of a router device for routing communication messages. Each computer on the corporate network 2 side has access to various plant applications residing on plant applications servers to retrieve plant data that might originate from remote stations. Based on information received from remote stations, automated or operator-driven supervisory commands can be pushed to remote station control devices, which are often referred to as field devices. Field devices control local operations such as opening and closing of valves and breakers, collecting data from sensor systems, and monitoring the local environment for alarm conditions.

In the exemplary plant network 4 of FIG. 2, it includes a SCADA system 40, DCS 42 and plant servers 30 running various plant applications that collect, analyze and control various plant devices. The SCADA system 40 includes several remote stations 44 each containing RTU/PLCs' connected to various control devices such as valves and pumps, and sensors such as level sensor, pressure sensor and flow sensor. The DCS 42 includes process controllers and PLCs' connected to sensors and control devices such as motors and valves.

Typically, individual security rules are configured on the firewall device 28 for each computer residing on the corporate network 2 for an authorized access to any plant application in the plant network 4. As can be appreciated, this results in hundreds of security rules being configured on the firewall. In other words, current methodologies are mainly focused on separating the two networks via a firewall system. However, such firewall allows numerous authorized network connections to pass through since any computer on the corporate network 2 side can access and interact with any plant application or plant server on the plant network 4.

Such numerous connections typically introduce the following deficiencies: 1) unnecessary processing load and configuration of multiple security policies on the firewall due to the need to code the firewall individually for each computer in the corporate network; 2) higher computer virus spread probability due to multiple connections; and 3) plant application incompatibilities and access difficulties.

Therefore, it would be desirable to provide a system and method for more securely control and yet more easily maintain access to plant networks.

SUMMARY OF THE INVENTION

According one aspect of the present invention, a system for centrally controlling access by computers in a corporate network to a plant network that runs plant applications is provided. The system includes an access control computer in communication with the corporate network. The access control computer includes a memory, a processor coupled to the memory and a multi-user application stored in the memory and executable by the processor. The multi-user application communicates with a plurality of computers in the corporate network concurrently and communicates with at least one plant application running in the plant network to retrieve data from and pass data to the plant application on behalf of the plurality of computers in the corporate network concurrently. Since all communication from the plurality of computers is funneled through the access control computer, the likelihood of any virus or worm spreading into the plant network is minimized.

In another aspect of the present invention, the access control computer includes a hosting software for hosting a hosted application. The hosted application communicates with a plurality of computers in the corporate network; and communicates with at least one plant application running in the plant network to retrieve data from and pass data to the plant application on behalf of the plurality of computers in the corporate network.

In another aspect of the present invention, a filtering device is positioned between the access control computer and the plant network and passes to the plant network only the messages originated by the access control computer.

In another aspect of the present invention, a method of centrally controlling access by computers in a corporate network to a plant network that runs plant applications is provided. The method involves providing an access control computer in communication with the corporate network. The access control computer includes a memory; a processor coupled to the memory and a multi-user application stored in the memory and executable by the processor. The multi-user application communicates with a plurality of computers in the corporate network concurrently and communicates with at least one plant application running in the plant network to retrieve data from and pass data to the plant application on behalf of the plurality of computers in the corporate network concurrently. When a message is received by a filtering device, it passes the received message to the plant network only if the received message is determined to be from the access control computer.

DETAILED DESCRIPTION OF THE INVENTION

The present invention eliminates the above described problems by using a single link connector (SLC) which is preferably located in a single secure location. The SLC is a computer (see FIG. 4, for example) that resides on the corporate network 2 side as a standalone system or as an integrated part of an Ethernet switch (module), to provide a unified access to plant applications such as a vibration and power monitoring application through the plants. In other words, rather than allow each computer on the corporate network 2 to communicate with the various plant applications residing in the plant network 4, those plant applications are only allowed to communicate with the SLC and not with any other computer on the corporate network.

Thus, the SLC consolidates numerous individual network connections originating from the corporate network, thus minimizing firewall security rules to configure and maintain. It improves the current architecture of corporate-to-plant network interface design by adding a device that consolidates all network connections into a single connection.

The SLC design also significantly reduces the probability of virus and malware spread to/from the plant network 4, since the firewall separating the corporate network 2 from the plant network will inspect traffic from preferably a single computer, which is already protected and secured physically and logically.

The SLC can be configured with custom off-the-shelf (CoS) software to provide additional features such as application visualization and representation to enhance application compatibility and facilitates ease of access by providing web enabled interface.

The SLC enhances the security design of corporate-to-plant network interface by facilitating a single connection between corporate and plant network through the firewall. Having a single connection between the corporate network and the plant networks yields the following advantages:

1. reduces processing and configuration load on the firewall since one set of firewall rules is required for only one computer;

2. reduces the probability of computer virus spread, since all traffic funnels through one computer only, being the SLC server; and 3. the SLC can also provide application visualization and representation capabilities, configured with special software, providing application compatibility and ease of access.

The present invention provides an improvement to the current security design adopted by international standards bodies looking after Process Control security such as ISA, API, and others. The current design, advocated by international standards bodies, calls for separating the corporate network from the plant network via a firewall system, data diode, or any other application security gateway. The SLC computer according to the present invention improves this design by consolidating numerous network connections into a single security policy as will be discussed in more detail herein.

Figure 1:
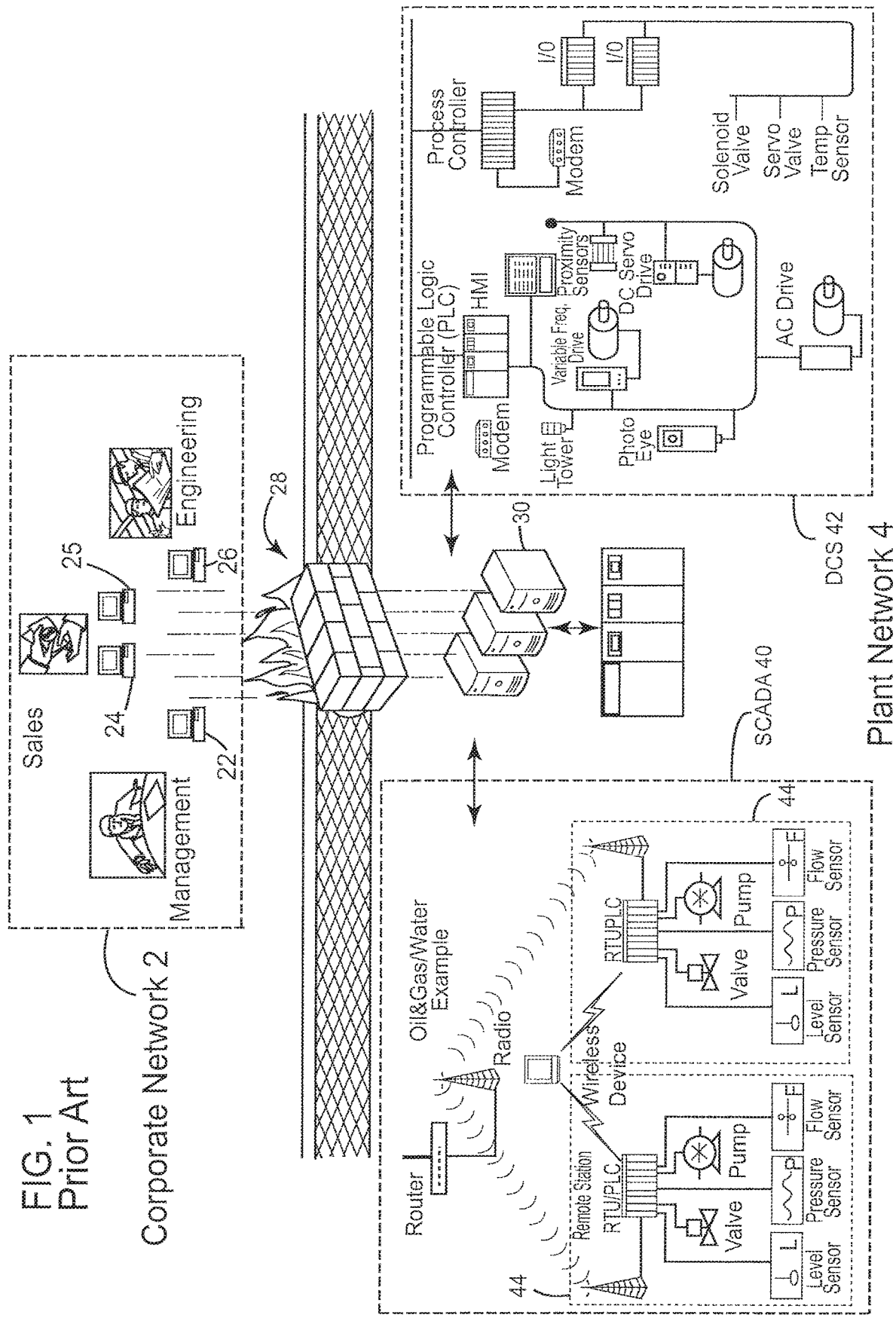
FIG. 1 is a functional block diagram of a network security architecture according to prior art.
Figure 2:
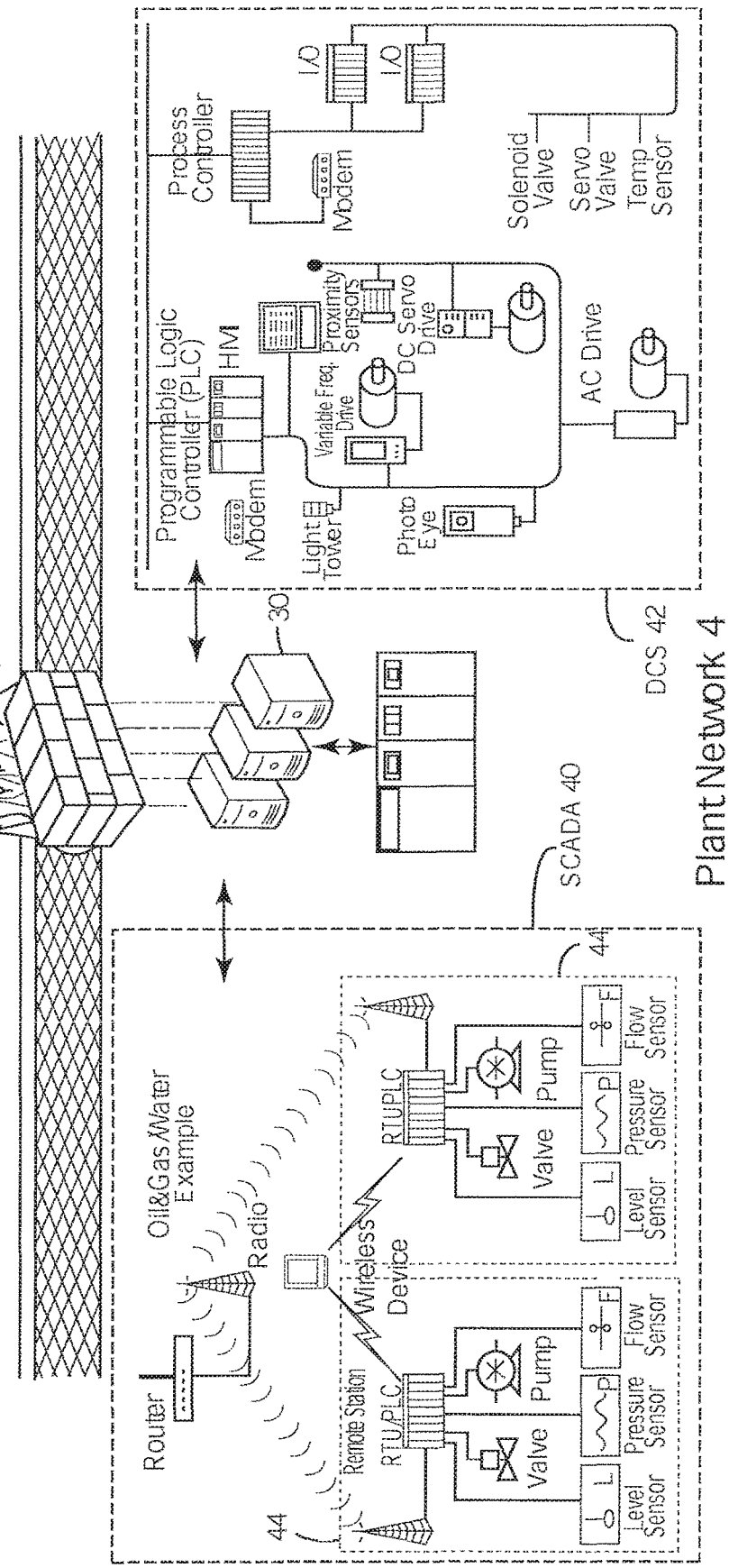
FIG. 2 is a functional block diagram of a network security architecture according to an exemplary embodiment of the present invention.
Figure 4:
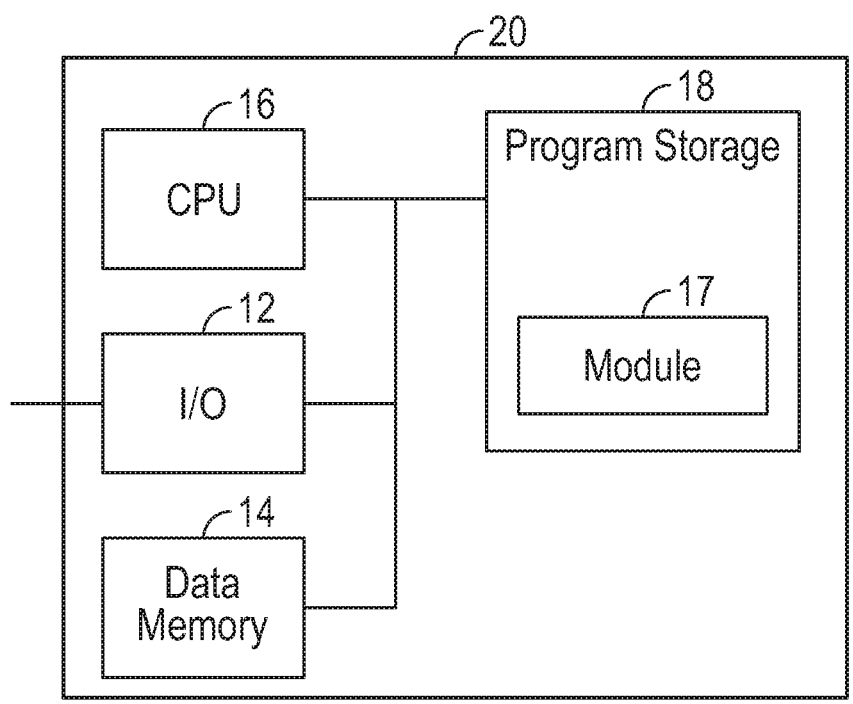
FIG. 4 is a functional block diagram of a single access control computer according to the invention.
Figure 3:
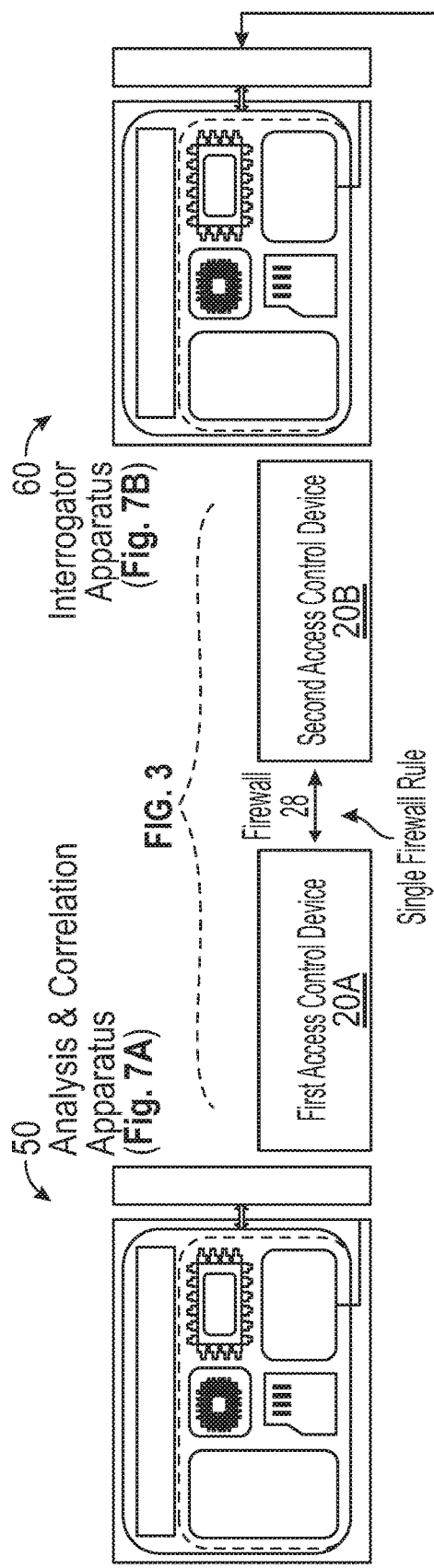

According to the present invention, the SLC is a computer 20. The computer 20 is the only computer which is allowed to communicate with the plant network 4. Preferably, the SLC includes a single computer, in which case only a single computer is allowed to access the plant network 4. FIG. 2 shows one embodiment of the present invention in which an SLC computer 20 is provided on the corporate network 2 side. The SLC computer can be any computer or server with at least one processor for executing software applications as shown in FIG. 4, for example. Referring to FIG. 4, the computer 20 includes I/O ports (communication interface) 12 operable to communicate with user computers (work stations) 22-26 on the corporate network 2 and with plant applications on the process control networks (i.e., plant network 4), a processor (CPU) 16 although multiple processors are possible depending on the size of the corporate network 2, a memory 14 coupled to the processor, and software or software modules 17 stored in a program storage 18 (e.g., hard drive) executable by the processor. The elements 12,14,16,18 are all connected to each other through a common bus 11.

Advantageously, the SLC computer 20 is adapted to host multi-user software applications which are capable of communicating with multiple users 22-26 (user computers or work stations) concurrently on the corporate network 2 and which are also capable of communicating with process applications that are running in the process control networks (plant network 4) side. As shown in FIG. 2, only the SLC computer 20 is allowed to communicate with the plant network. In other words, applications running in individual user computers on the corporate network 2 side cannot directly communicate with plant applications in the plant network 4. If they tried, those communications would become blocked by a filtering device 28 that filters computer communication messages. One such device is a firewall device 28 as shown in FIG. 2. This way, only one set of security rules are needed for one computer (e.g., for one Internet Protocol address), which results in substantially reduced load on the firewall device 28 and substantially reduced security administration. Since all communication traffic funnels through one computer only, being the SLC computer 20, the probability of any user computer from spreading a virus or worm to the plant network is greatly reduced.

Although FIG. 4 diagrammatically illustrates the SLC computer 20, such computer can be used as any computer or server described herein such as the user computers 22-26, plant applications servers 30 running in the plant network 4 and firewall device 28 which may be a part of a switch/router.

In one embodiment, the SLC computer 20 stores and hosts in the program storage 18 a group of applications or modules 17. Referring back to FIG. 2, in one embodiment, an application hosting software called "Citrix XenApp" (formerly known as "Citrix Metaframe") from Citrix Systems, Inc. of Fort Lauderdale, Fla. (or alternatively, custom-developed software) is stored in the program storage 18 and is used to host various software applications that are adapted to communicate with various corresponding plant applications residing in the plant network 4. In other words, a power monitoring application running in the SLC computer 20 communicates with a corresponding or counterpart power monitoring application running in the plant applications server 30.

The hosting software essentially turns the SLC computer 20 into a hosting server that allows users or user computers 22-26, running an associated thin client software, to run the hosted application stored in the program storage 18 inside the SLC computer as if it were running in their own computers.

Specifically, the hosting software is a set of proprietary or commercial server software that enables multiple users to launch hosted applications on the SLC computer 20 and view and interact with the hosted application, being executed inside the SLC computer, as if it were running on the user's own computer. If done correctly, the hosting software (which can be proprietary software developed by the control system vendor in support of industrial protocols such as OPC, Modbus, or DNP3) should bring the hosted application's user interface, audio, and print jobs to the user's computer in a way that is completely transparent to the users. Alternatively, a hosting software called Microsoft Remote Desktop can be used among many others.

The hosting software hosts a plurality of hosted applications which are stored in the program storage 18. The hosted applications are generally adapted to handle multiple users at the same time. Usually, while only a single image of the application is stored in the program storage 18, multiple instances of the application are executed by the processor 16 inside the SLC computer 20. Examples of the hosted applications are power monitoring application, vibration monitoring application and general data collection and analysis application. An example of a general data collection and analysis application is called "OSI PI" of OSIsoft, LLC of San Leandro, Calif. OSI PI hosted application is a software used to capture, process, and store plant data. OSI PI application communicates with various plant applications in the plant applications server 30 and also with various PI interface software installed at various data collection locations. The PI interface software standardizes the data collected from various disparate vendors' devices and works with a plurality of standard protocols along with older or even retired devices.

Referring to FIG. 2, an exemplary process flow of collecting data by a user will now be explained. Assume that a user sitting at a user computer 22 would like to obtain the current power levels of a particular plant. The user executes a client software in the user computer 22 which is associated with the hosting software stored in the SLC computer 20 and selects OSI PI as the hosted application. The hosting software in the SLC computer 20 starts and executes an instance of the OSI PI in the memory 14 of the SLC computer.

At the request of the user computer 22, the OSI PI application communicates with a power monitoring application running in the plant applications server 30. Alternatively, the OSI PI application may communicate directly with a PI interface module located at the plant where power is being measured or indirectly with the PI interface module through the power monitoring application running in the plant applications server 30.

Unlike the switches, routers and firewall, which communicate with the user computers 22-26 at layers 1, 2 and 3 of the Open System Interconnection (OSI) model, the SLC computer communicates at higher layers in one embodiment.

In the OSI model, there are seven layers (layers 1-7). Layer 7 (application layer) interacts with the operating system or application whenever a user (user computer) chooses to transfer files, read messages or perform other network-related activities. Layer 6 (presentation layer) takes the data provided by the application layer and converts it into a standard format that the other layers can understand. Layer 5 (session layer) establishes, maintains and ends communication with the receiving device. Layers 5-7 comprise an application set.

Layer 4 (transport layer) maintains flow control of data and provides for error checking and recovery of data between the devices. Flow control means that the transport layer looks to see if data is coming from more than one application and integrates each application's data into a single stream for the physical network. Layer 3 (network layer) handles the way the data is sent to the recipient device. Logical protocols, routing and addressing are handled here. Layer 2 (data layer) assigns an appropriate physical protocol to the data. Also, the type of network and the packet sequencing is defined in this layer. Layer 1 (physical layer) defines the actual hardware. It defines the physical characteristics of the network such as connections, voltage levels and timing. Layers 1-4 comprise a transport set.

Among these layers, in one embodiment, the SLC computer 20 communicates at the higher layers defined by the application set. Preferably, the SLC computer 20 communicates with the user computers 22-26 and process applications at the application layer (layer 7) although some communication is also done in the presentation layer (layer 6).

Using layer 7 for communication, the SLC computer 20, which is essentially an application proxy solution, provides centralized application requests and seamless desktop virtualization capabilities that enable secure remote access and unified data propagation to and/or from plant information resources.

Before the data requests from the OSI PI application can be transmitted, the firewall device 28 checks the messages to determine whether to allow the message to pass or block them. Because only the SLC computer 20 is allowed to send messages to the plant network 4, there is only one set of firewall rules to develop and maintain. All messages from computers other than the SLC computer 20 will be blocked. Preferably, only messages that originated by one of the hosted applications residing in the SLC computer 20 will be allowed to pass to the plant network 4 by the firewall device 28.

Similarly, all messages from the plant network 4 whose destination is the SLC computer 20 will be allowed to pass to the corporate network 2 by the firewall device 28.

Since the firewall separating the corporate network 2 from the plant network 4 will inspect traffic from preferably a single SLC computer 20, which is already protected and secured physically and logically, the SLC design significantly reduces the probability of virus and malware from spreading to and from the plant network 4.

Figure 3:
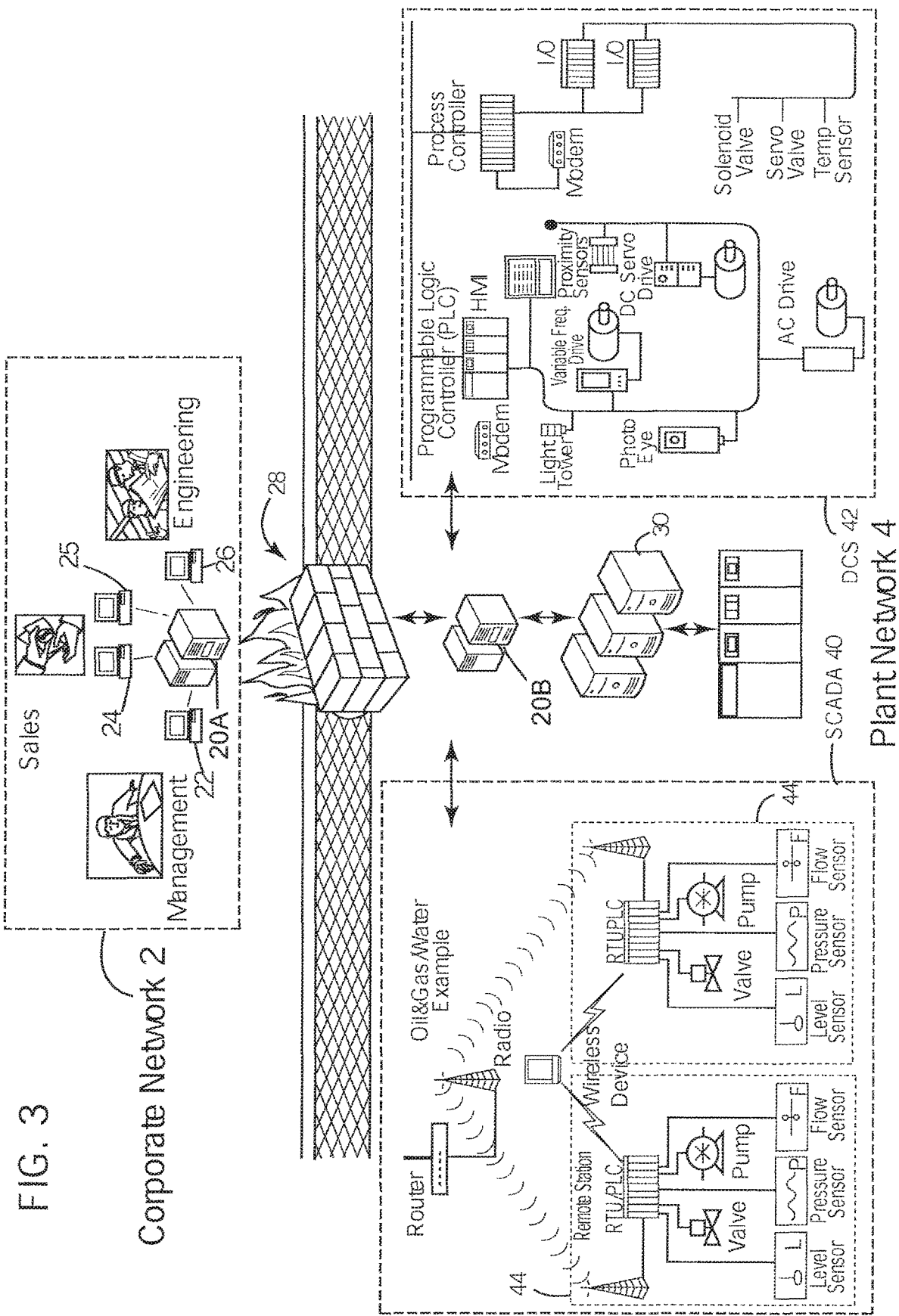
FIG. 3 is a functional block diagram of a network security architecture according to an alternative embodiment of the present invention.

FIG. 3 illustrates a functional block diagram of an alternative embodiment of the present invention. As shown in FIG. 3, an SLC computer can be installed on both the corporate network 2 side and the plant network 4 side to bring about added traffic regulation in and out of both networks, such that only applications running in the SLC computer between the two SLC computers can communicate with each other. These are shown in FIG. 3 as first access control device 20A in a multiplexer (MUX) configuration that is located between the corporate network 2 and the firewall (or data diode or any other application security gateway), and as second access control device 20B in a demultiplexer (DEMUX) configuration that is located between the firewall and the plant network 4.

This continuation-in-part application focuses on a further embodiment of the invention, specifically directed at gauging Process Control System (PCS) Functional Specification competency. A process control system includes not only a process control network (PCN), but also process automation systems (PAS), management information systems (MIS), and the like.

A Functional Specification Design (FSD) is a corporate-level engineering baseline that sets the minimum "functional" parameters for a "Control System" to ensure that the subject system is operating meets predetermined specifications to meet a business target or objective. For example, a business target for a gas plant may be to produce "x" number of cubic feet of liquefied petroleum gas (LPG) per year, whereas a business target for a refining facility may be to maximize its refining capacity using hydrocracking, use of catalysts, additives or special agents.

In another example, the business target for a tank farm may be to facilitate predictive storage capacity planning which will enable prediction of future sale transactions with local and international product distribution customers. To meet the aforementioned business objectives, the "control systems" operating those industrial facilities must be periodically verified for performance adequacy and overall efficiency.

FSD competency is different from obsolescence determination, as obsolescence deals with a product's lifecycle from the point of view of sales, spare part availability, and support, whereas FSD competency deals with a product's continuing capability toward achieving a business target. For example, a piece of computing equipment, such as a server, while not classified as "obsolete" may nevertheless not be performing to FSD's baseline expectations because of the way it is configured or resourced. This is not unusual, as with the passage of time, system owners often re-use some of their equipment to concurrently provide additional (auxiliary, sometime primary) functions to save time and money. For example, a server which was originally dedicated to providing centralized authentication services, i.e. Active Directory or RADIUS, may also be configured to act as a database server, a print server, a Dynamic Host Configuration Protocol (DHCP) relay server, or a Domain Name System (DNS) server. In other cases, virtualization services may be deployed on a server to provide multiple "roles" or functions running on the same hardware.

In another example, an IEEE 802.3 Ethernet switch which was originally installed to provide "access" level services may be re-configured to concurrently provide "core" level services. On an Ethernet switch, "core" level services require more resources to handle tasks such as link aggregation, Virtual LAN segmentation (VLAN) and the potential processing of Extended Access List (EACL) filtering, all of which could very well contribute to performance degradation which will inevitably influence negatively planned business targets.

The FSD is typically developed and maintained by the central engineering arm of a given corporation and contains multiple sections referencing different areas of IT-OT such as Automation, engineering, Networking and Communications. IT-OT is the integration of information technology (IT) systems used for data-centric computing with operational technology (OT) systems. To determine FSD competency, a manual verification process could be used, however the manual process is time- and resource-intensive and can only provide 20-30% coverage at best (due to the use of a hot spot checking process). Additionally, the manual process is limited from a "frequency" point of view (i.e. the number of times it can actually be conducted), thus making the yielded FSD competency figures often inaccurate and mostly outdated.

This disclosure describes a system and method to facilitate automated collection, analysis and correlation of a "Process Control System (PCS)" specification and running configuration information against the FSD pre-calculated baseline, in order to generate a score which will determine a system's potential capacity (potency) to meet the business target within a specific time factor, based on which reports and system alarms may be generated and dispatched (e.g., OPC alarms can be sent to an HMI or PCS engineering workstation). The automated system is fast and requires no human interface. It can be carried out routinely as per a time schedule with a configurable frequency. The system will also provide gap analysis so that the operator will be able to recognize which part of the control system requires optimization. The disclosed system is integrated with optimized firewall rules so as to avoid unnecessary duplication of hardware connected to the firewall.

Figure 5:
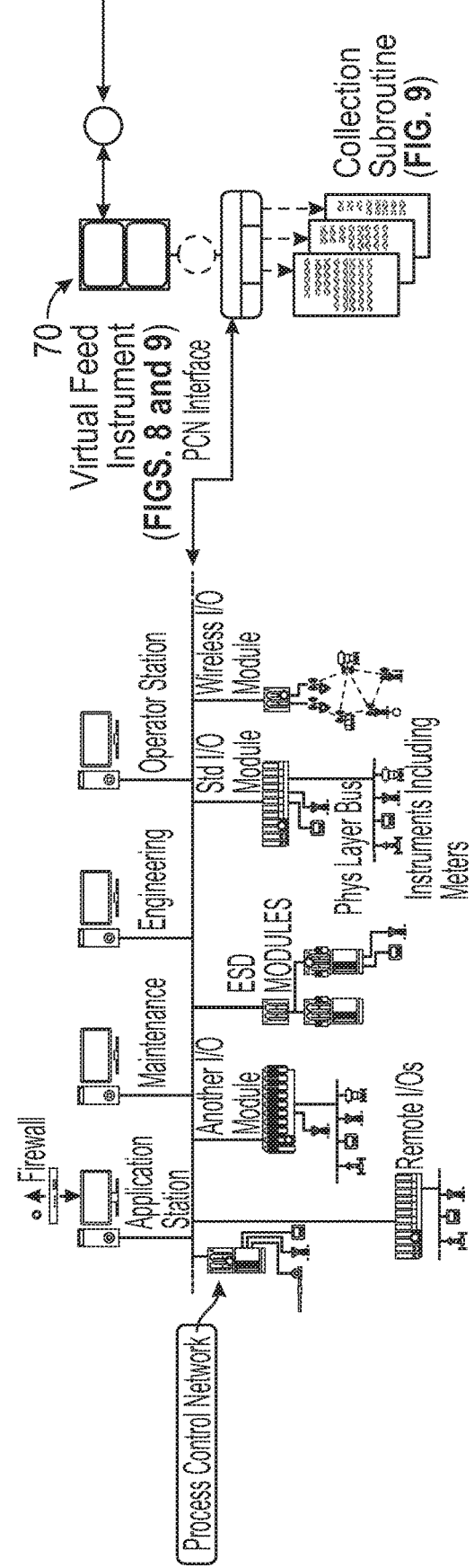
FIG. 5 is a functional block diagram of an alternative embodiment of the present invention, being a system to gauge Process Control System (PCS) Functional Specification competency.

The system, as shown in FIG. 5, includes an analysis & correlation apparatus 50, an interrogator apparatus 60, and a virtual feed instrument 70.

Figure 6:
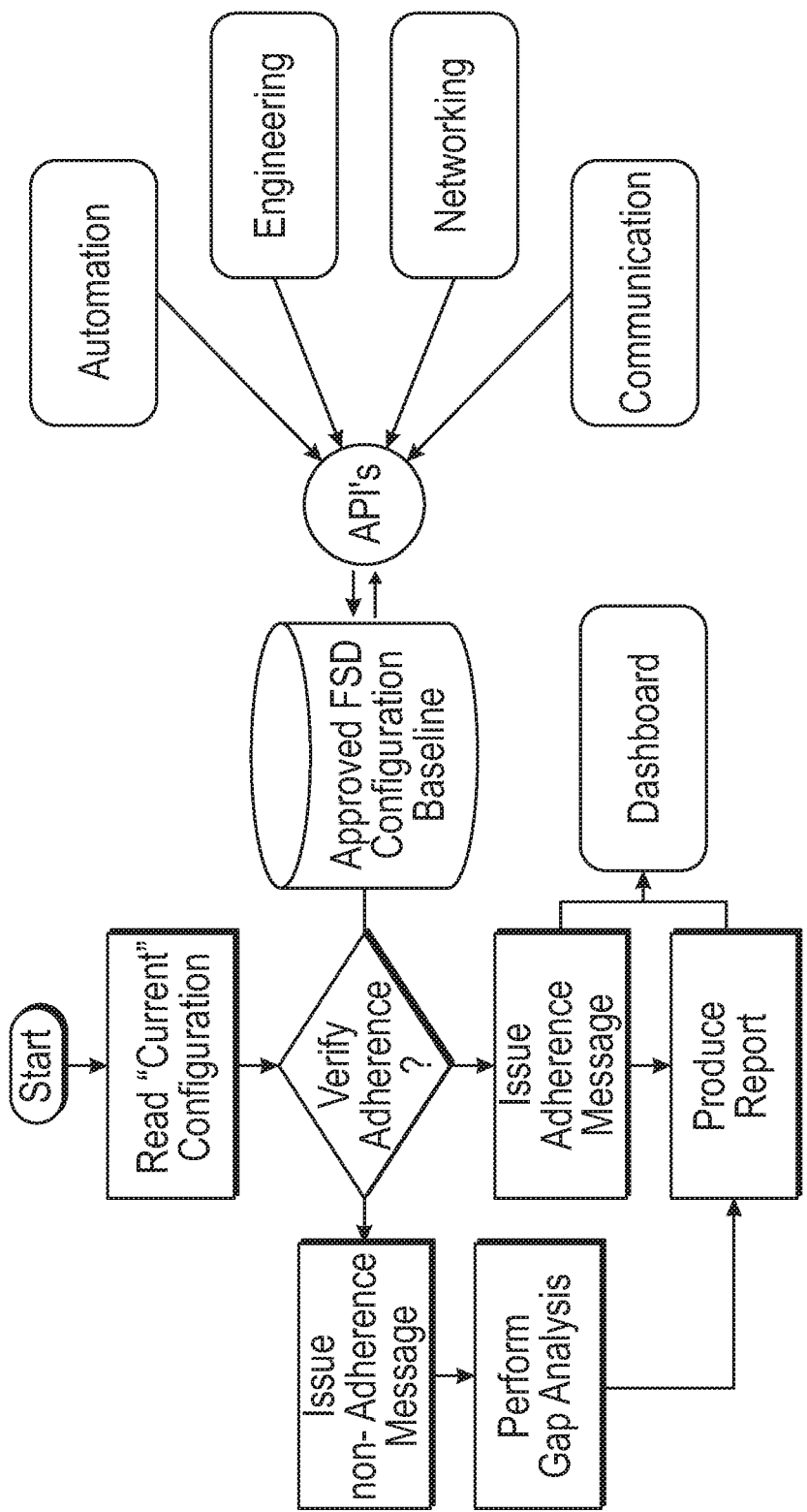
FIG. 6 shows Functional Specification Design adherence assessment logic.
Figure 7A:
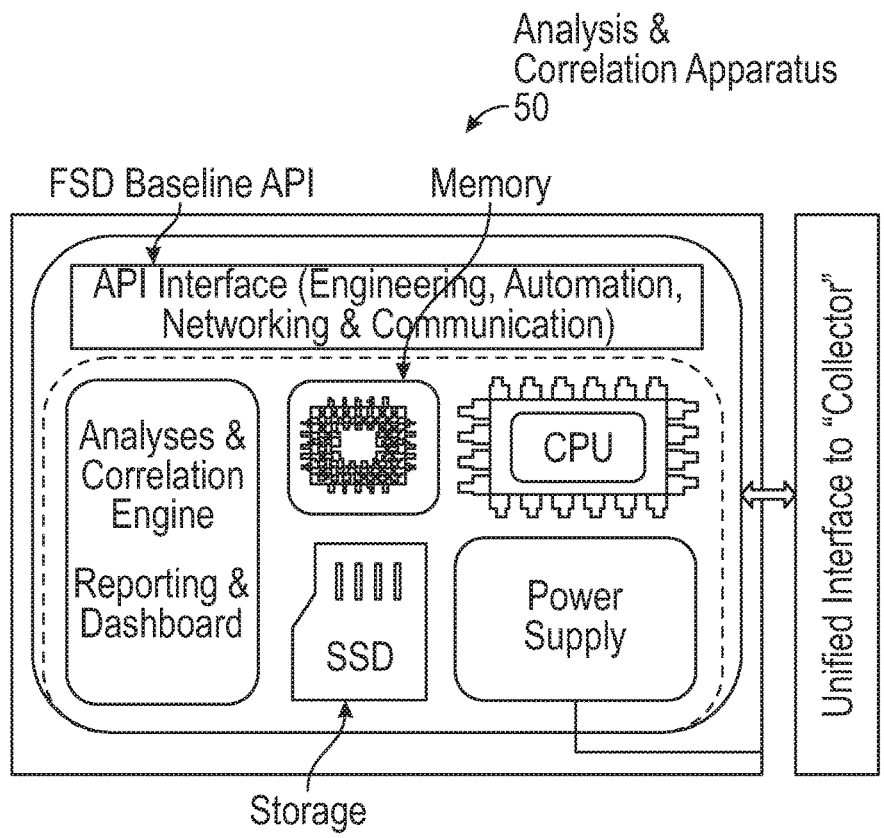
FIG. 7A shows an analysis & correlation apparatus associated with the system to gauge PCS Functional Specification competency.

The analysis & correlation apparatus 50, with logic shown in FIG. 6 and a hardware block diagram shown in FIG. 7A, includes API interfaces to access engineering, networking and communication portions of the FSD on the business network. The analysis & correlation apparatus 50 is integrated, e.g. as an add-on card, to the first access control device 20A (shown in FIG. 3), which as discussed above is located between the corporate business network and the firewall, and which is in a multiplexer (MUX) configuration. The analysis & correlation apparatus 50 reads the configuration input from each Process Control Network (PCN) component and compares it against the FSD baseline which will be obtained dynamically through the supported API links to automation, engineering, networking and communications modules residing on the corporate network.

The interrogator apparatus 60 is a "collector" component fitted as an add-on card on the second access control device 20B (shown in FIG. 3), which as discussed above is located between the firewall and the plant network 4, in a de-multiplexer (DEMUX) configuration. The "collector" component is composed of a hardware with a central processing unit (CPU), memory, hard disk and a Virtual feed Instrument (VFI)-receiver.

Figure 7B:
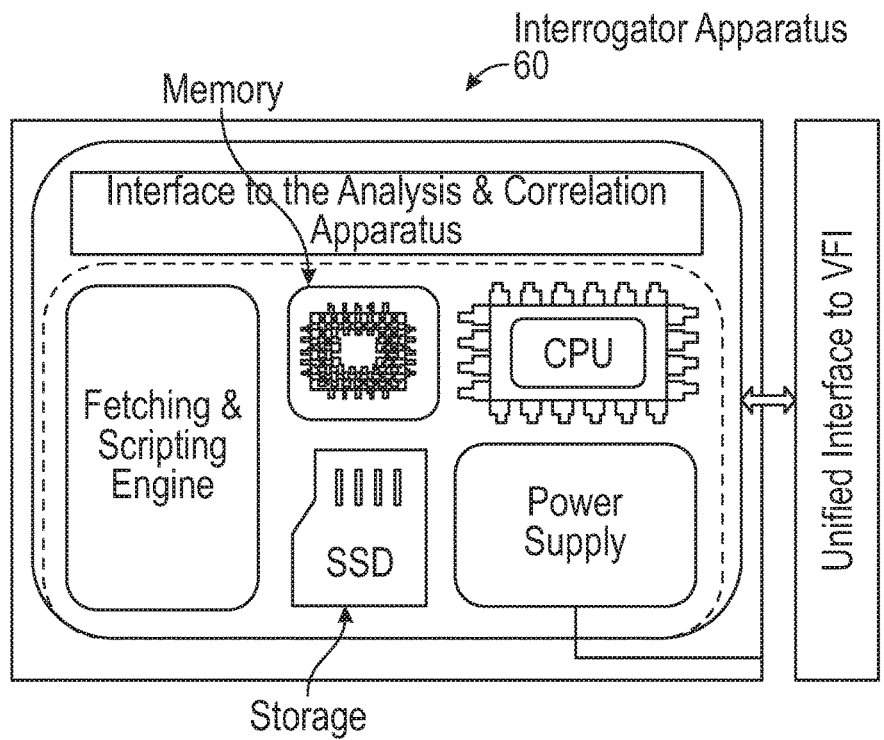
FIG. 7B shows an interrogator apparatus associated with the system to gauge PCS Functional Specification competency.
Figure 8:
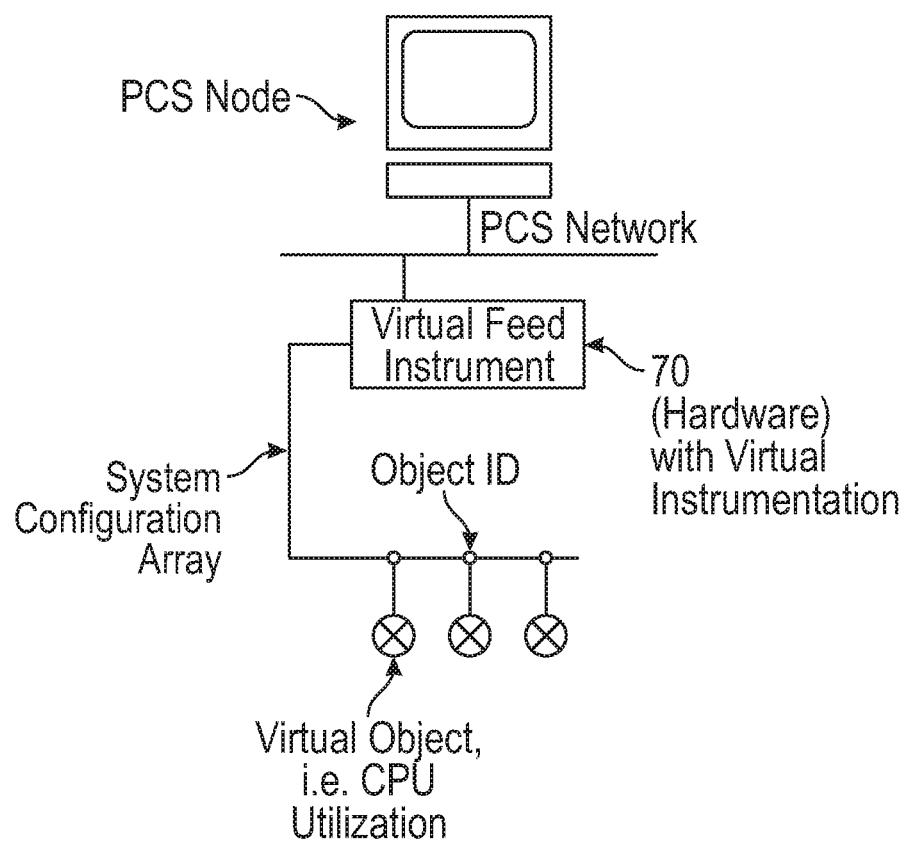
FIG. 8 shows the architecture associated with a virtual feed instrument associated with the system to gauge PCS Functional Specification competency.

FIG. 7B shows a hardware block diagram of Virtual feed Instrument (VFI) 70, which interfaces to hundreds of plant automation components (i.e., nodes) such as controllers, Human Machine Interfaces (HMI), field sensors and transmitters to fetch configuration information. VFI 70 is a piece of hardware comprising a CPU, memory, disk and an industrial protocol stack (i.e. Modbus, OPC, TCP/IP, DNP3) coupled with virtualization services to resemble an industrial instrument with the capability to communicate with other field computers, controllers, sensors and transmitters over one network segment at a time. FIG. 8 illustrates the architecture of VFI 70. The primary function of VFI 70 is to fetch the required configuration information from each node and populate each process tag with its correspondent value (e.g., analog 4-20 mA or a digital HART signal) and pass them on to the "collector" component of interrogator apparatus 60.

Figure 9:
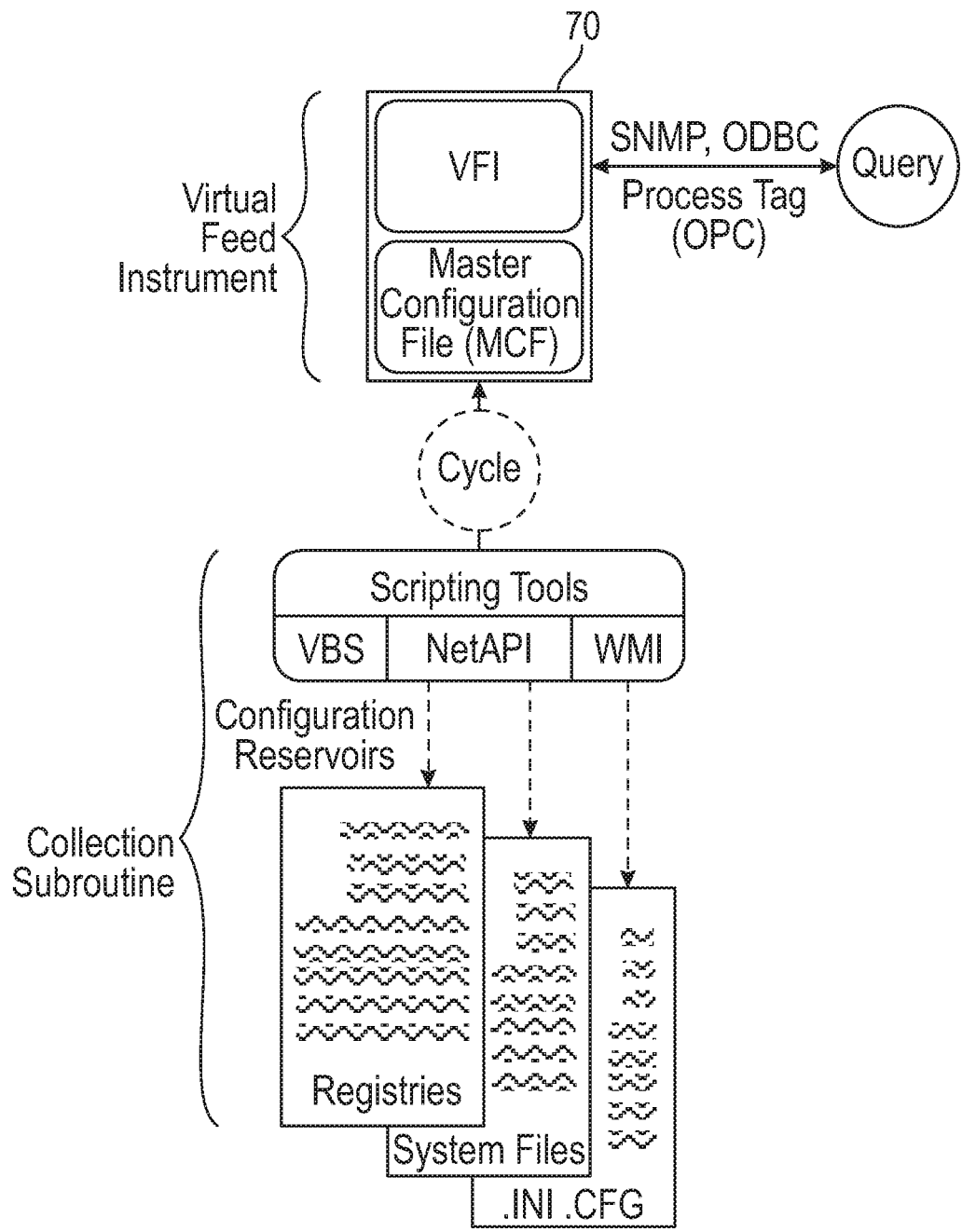
FIG. 9 is a functional block diagram of a virtual feed instrument and also of a reporting apparatus associated with the system to gauge PCS Functional Specification competency.

To achieve this objective, VFI 70 scans each node on the Process Control System (PCS), as shown in FIG. 9, and executes an information fetching subroutine on a predefined interval, and outputs the results into a Master Configuration File (MCF) associated with VFI 70. The objective of the information fetching subroutine is merely to collect the required configuration information from each device or instrument and output it into a format that is compatible with the intended warehousing database. The scripts will "NOT" do any correlation or data analysis, as this will be performed later by the analysis & correlation apparatus 50 fitted on first access control device 20A (on the business network 2).

The collection subroutine utilizes industry available tools such as Windows Management Instrumentation (WMI) scripting, which enables the collection of computer management data from many sources and makes it accessible by using standard interfaces. WMI can also be used to set configuration details and detect changes in the configuration using WMI events. WMI or any other tools or platforms such as NETAPI could be utilized to fetch the required information based on a predetermined interval using a systems scheduler. The output will be customized depending on the target database format.

FIGS. 10 and 11A-11C show examples of potential connectivity options to retrieve functional specification competency information from PCS devices, including components such as network components (switches, routers, and the like) for which SNMP can be used.

Similarly, PCS includes components such as computers (i.e., servers and workstations) for which ODBC can be used to retrieve functional specification competency information.

Finally, PCS includes process instrumentations (i.e., sensors, valves, and the like) for which OPC can be used to retrieve functional specification competency information. The illustration of SNMP, ODBC and OPC are examples, but the invention is not limited to those options. For example, the system may support Syslog for security log consolidation, or Remote Procedure Calls (RPC) to invoke certain actions on field devices.

Figure 10:
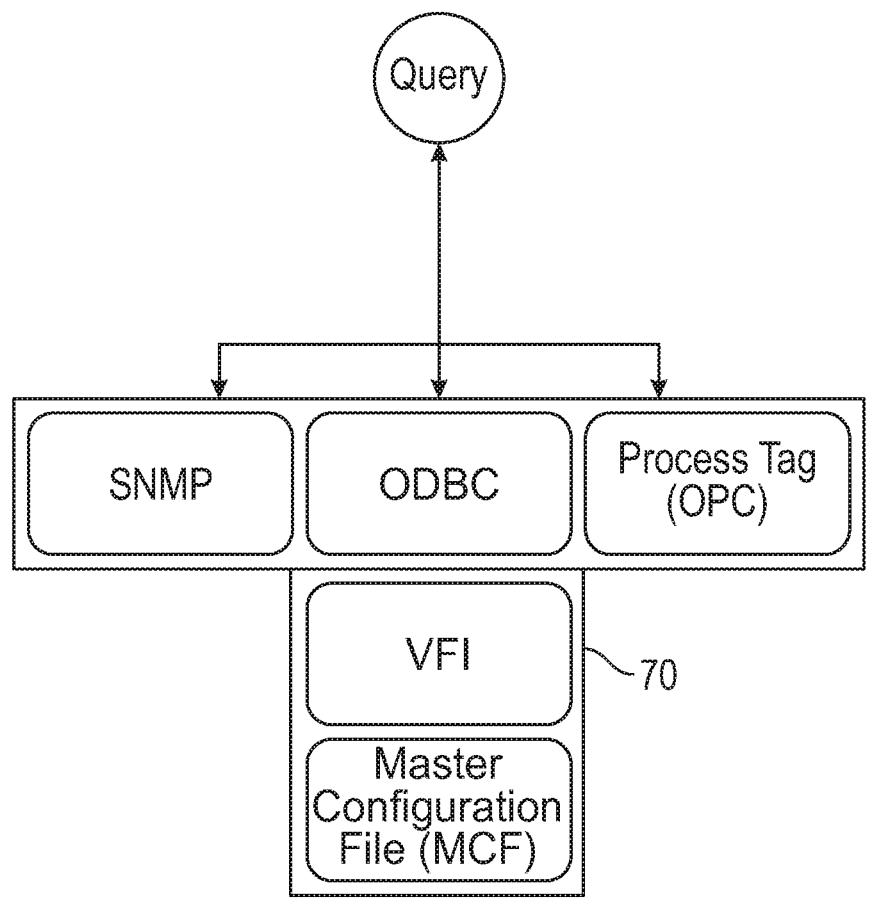
FIG. 10 shows interfaces available to a virtual feed instrument.

FIG. 10 is a diagram illustrating an example of how information is fetched from field devices by the Virtual Feed Instrument 70. According to some implementations, the virtual feed instrument 70 receives a query through a transport protocol mechanism such as SNMP, ODBC and MODBUS which directs a scripting engine (i.e. VBS, WMI and NETAPI) to fetch configuration information from configuration reservoirs as per a configurable polling cycle and stores it in master configuration file (as shown in FIGS. 9 and 15).

Figure 11A:
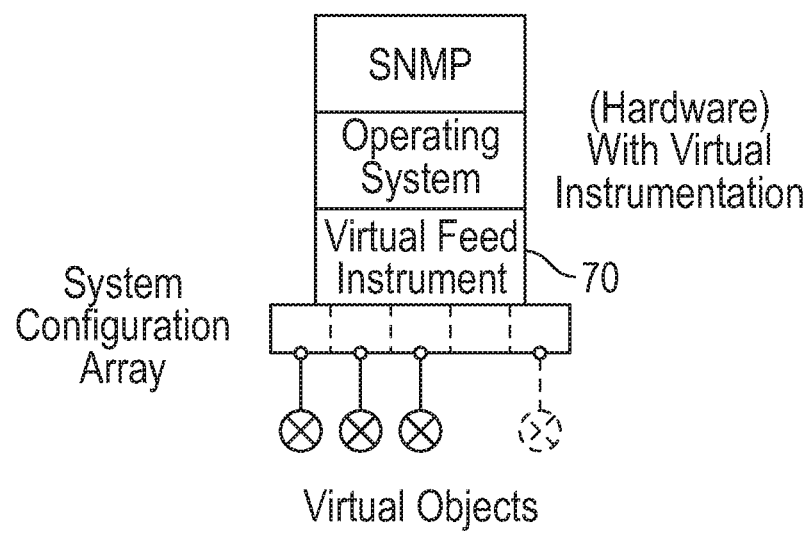
FIGS. 11A-11C show virtual feed instruments with different protocols.

FIG. 11A is a block diagram illustrating an implementation example of the virtual feed instrument 70 using Simple Network Management Protocol (SNMP). According to some implementations, the virtual feed instrument 70 receives a query through SNMP, through the device's operating system (i.e. Windows, LINUX etc.) hosting the virtual feed instrument engine. The virtual feed instrument 70 controls a system configuration array with virtual objects (identifiers) that hosts device performance information (i.e. hard disk space, memory, CPU and network utilization data).

Figure 11B:
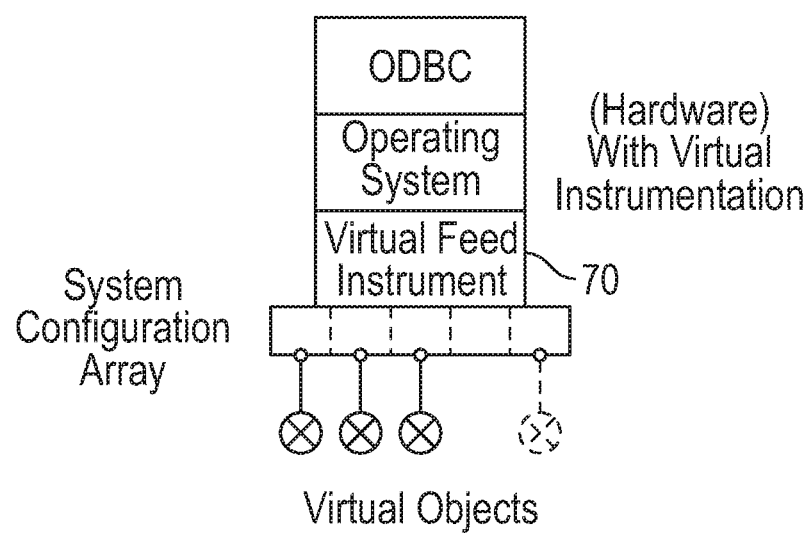

FIG. 11B is a block diagram illustrating an implementation example of the virtual feed instrument 70 using Open Database Connectivity (ODBC). ODBC is a standard interface (application programming interface (API)) used to access database management systems (DBMS) and fetch/manipulate information. According to some implementations, the virtual feed instrument 70 receives a query through ODBC, through the device's operating system (such as Windows or LINUX) hosting the virtual feed instrument 70. Virtual feed instrument 70 controls a system configuration array with virtual objects that hosts device performance information (i.e., hard disk space, memory, CPU and network utilizations data).

Figure 11C:
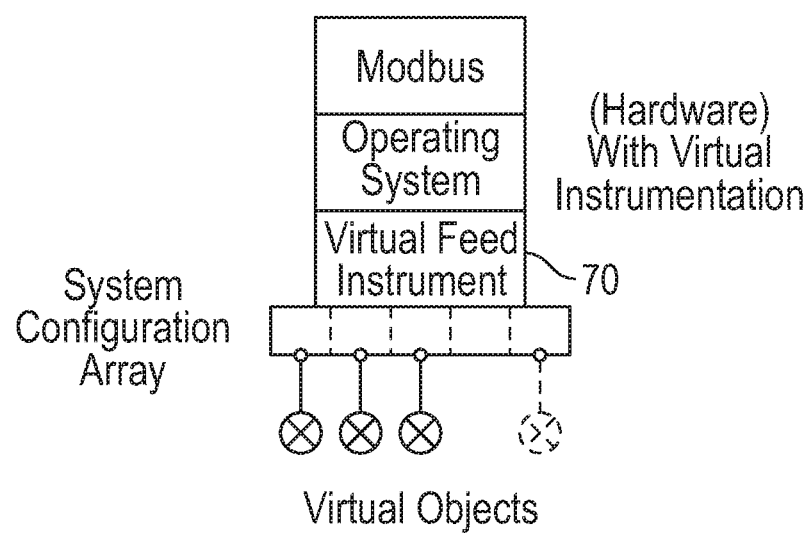

FIG. 11C is a block diagram illustrating an implementation example of the virtual feed instrument 70 using MODBUS. MODBUS is a standard communication protocol for connecting industrial electronic devices (i.e. programmable logic controllers (PLCs). According to some implementations, the virtual feed instrument 70 receives a query through MODBUS, through the device's operating system (such as Windows or LINUX) hosting the virtual feed instrument 70. The virtual feed instrument engine controls a system configuration array with virtual objects that hosts device performance information (i.e., hard disk space, memory, CPU and network utilizations data).

As shown in FIG. 7A, Analysis & Correlation apparatus 50 includes a reporting engine, which interfaces to a corporate-level dashboard, providing reports that are generated and communicated through SNMP traps, OPC or files (XML, JSON, or TXT).

For example, the reporting apparatus supports the Simple Network Management Protocol (SNMP) capabilities in addition to JSON (JavaScript Object Notation) being an open-standard format that uses human-readable text to transmit data objects consisting of attribute-value pairs to produce informative indicators such as shown in Table 1, below.

TABLE 1

| Indicator light | SNMP Trap | Value |
| --- | --- | --- |
| Green | 95% FSD discrepancy is observed for the past 6 months or more | ≥85% |
| Amber | FSD Discrepancy attention. Some issues still unresolved | <84% |
| Red | Severe FSD discrepancies observed | <29% |

Figure 12:
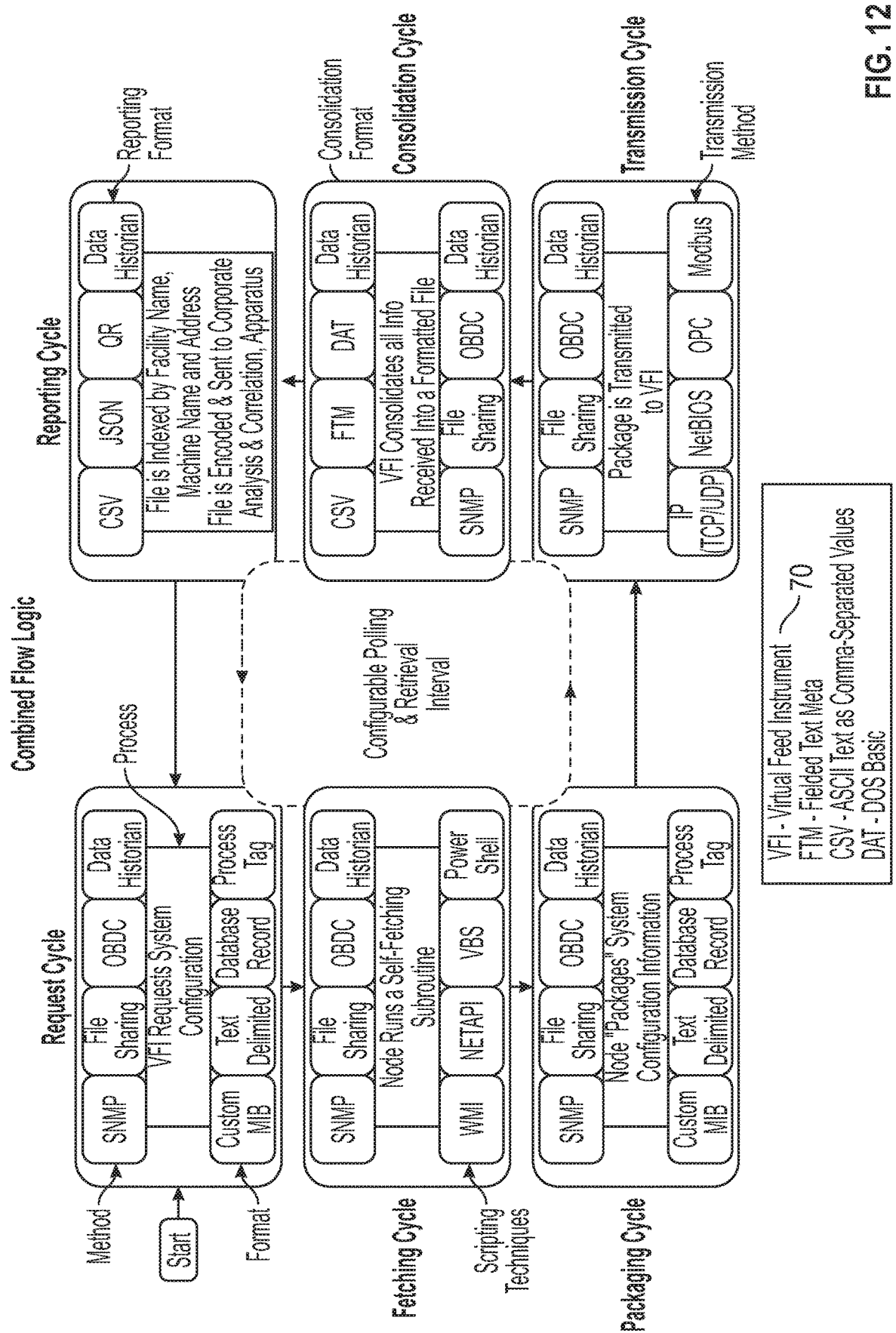
FIG. 12 illustrates the combined flow logic including a request cycle and reporting cycle for the system to gauge PCS Functional Specification competency.

FIG. 12 depicts the logic flow for the combined system. The direction of the polling engine is shown. For example, the system is initiated with a "Request" cycle, in this instance a request for configuration information. The "request" for information can be obtained via different "methods" such as SNMP, File Sharing, ODBC, and plant data historian. The "request" for information can accordingly be obtained via different "formats" such as Custom MIB (Management information Block), text delimited, database record or a process tag.

Once the system decides on both "method" and "format" of information request, the system goes to the "Fetching Cycle." In the "fetching" cycle, the information is "fetched" using any of the methods depicted earlier. However, different "scripting" techniques may be used, such as "Windows Management Instrumentation (WMI), NETAPI (netapi.dll is a module that contains the Windows NET API used by applications to access a Microsoft network), Visual Basic Script (VBS) and Power Shell scripting tool.

After fetching the information from each device in "raw" format, information will need to be "packaged" prior to transmission. In the "packaging cycle," information is packaged using any of the methods depicted earlier, such as SNMP, File Sharing, ODBC and plant data historian. However, the information can also be "packaged" in different "formats," such as Custom MIB (Management information Block), text delimited, database record or a process tag.

After the "fetching cycle," the information is ready for "transmission," thus the system initiates the "transmission" cycle using multiple "methods" and "formats."

As all information is "transmitted" from each node, the "Collector Apparatus" initiates a "Consolidation" cycle whereby all information for the entire plant is "consolidated" prior to reporting the information to the Analysis & Correlation Apparatus 50. Again, the information is consolidated using different "methods" and "formats" as depicted in FIG. 12.

Finally, as the information is received by the Analysis & Correlation Apparatus 50, information can be "reported" using reporting formats such as Fielded Text Meta (FTM), ASCII text as comma-separated values (CSV), or DAT-DOS Basic.

Figure 13:
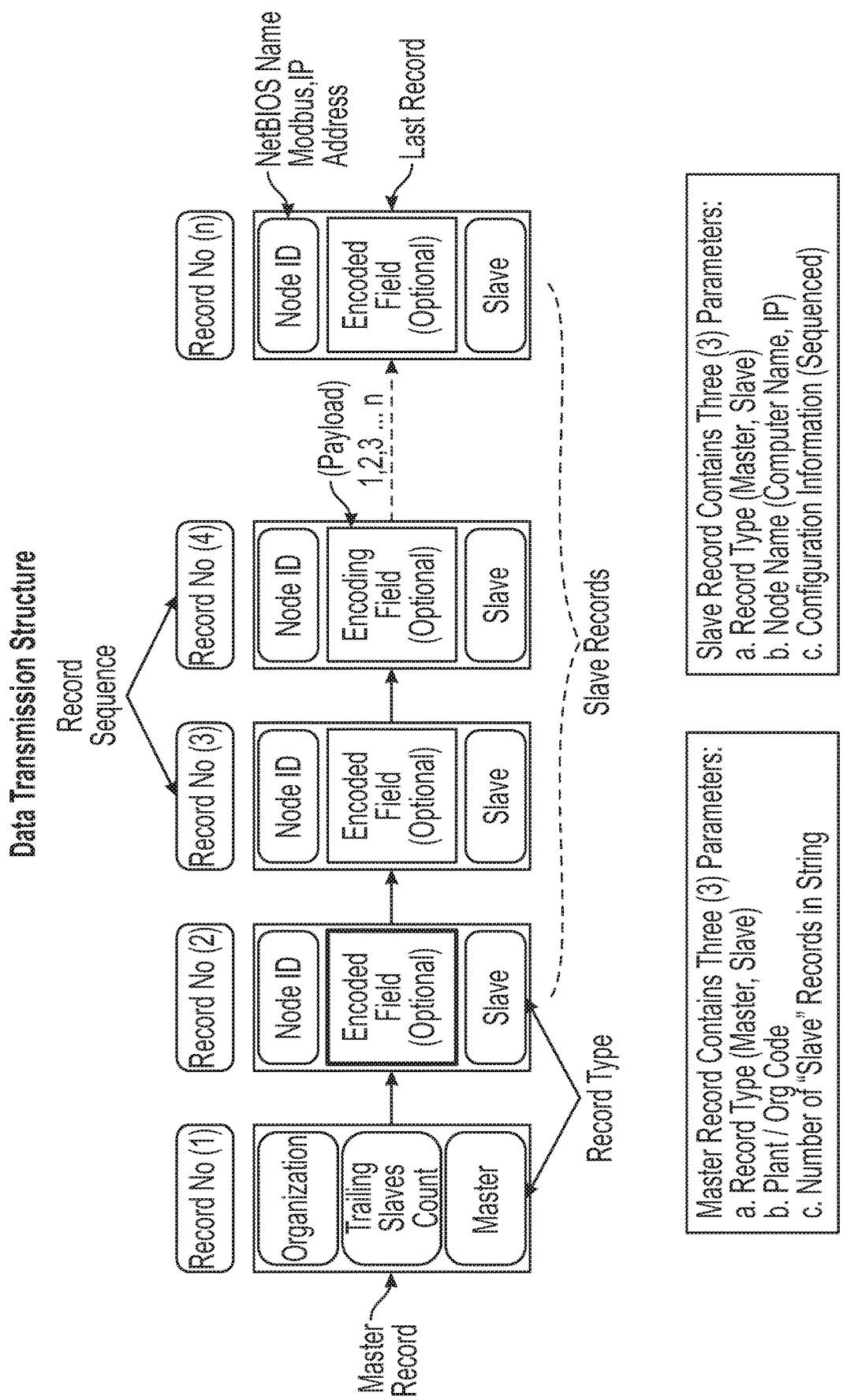
FIG. 13 illustrates a data transmission structure associated with the system to gauge PCS Functional Specification competency.

FIG. 13 depicts a custom "record" structure for transmitting a whole plant information from "Collector Apparatus" to the Analysis & Correlation Apparatus 50. As part of this custom structure, the transmission is headed by a "master" record containing subordinating fields such as "organization" which references the plant organization, followed by a "count" record which tells "how many trailing records are there as part of this transmission."

"Master" records contain three parameters: a Record type parameter identifying the record as being of the "Master" type, a Plant/Organization Code, and the Number of "Slave" records in the string.

"Slave" records also contain three parameters: a Record type parameter identifying the record as being of the "Slave" type, the Node name (Computer name, IP), and Configuration Information (sequenced).

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

The invention claimed is:

1. A system for gauging functional specification competency of a process control system including a plant facility network and a corporate business network that are interfaced via an application security gateway, the system comprising:
   a first access control device located between the corporate business network and the application security gateway, the first access control device being in a multiplexer (MUX) configuration, the first access control device including analysis and correlation circuitry;
   a second access control device located between the application security gateway and the plant facility network, the second access control device being in a demultiplexer (DEMUX) configuration, the second access control device including interrogator circuitry and a virtual feed instrument;
   wherein the corporate business network, the first access device, the application security gateway, the second access device, and the plant facility network are configured in a series-connected unidirectional MUX-DEMUX configuration;
   wherein the application security gateway is programmed with a single rule such that the only communications that can pass through the application security gateway is a communication between the first access control device and the second access control device;
   wherein the first and second access control devices are programmed such that service request communications originating from the corporate business network computers and addressed to the plant facility network is transmitted via the first access control system, the application security gateway, and the second access control system;
   wherein the virtual feed instrument connects to plant automation components within the plant facility network, and transmits data from the plant automation components to the interrogator circuitry, to be passed from the second access control device via the application security gateway to the analysis and correlation circuitry within the first access control device;
   wherein the analysis and correlation circuitry monitors the data transmitted by the interrogator circuitry, and also monitors data from engineering, networking, and communications devices on the corporate business network, and that compares performance of the monitored data to a predetermined baseline;
   the system further including reporting circuitry to provide reports of discrepancies between performance of the monitored data and the predetermined baseline, the reporting circuitry providing reports to a human-machine interface.

2. The system of claim 1, wherein the first and second access control devices each include a memory, a processor, a processor coupled to the memory, and hosting software stored in the memory and executable by the processor,
   wherein the hosting software of the first access control device is configured to communicate with a plurality of computers in the corporate business network; and
   wherein the hosting software of the second access control device is configured to communicate with the plurality of autonomous systems in the plant facility including process control field information and non-process applications such as closed circuit television (CCTV), asset management systems, and cybersecurity systems.

3. The system of claim 1, where the human-machine interface to which the reporting circuitry provides reports is located on the plant facility network.

4. The system of claim 1, where the human-machine interface to which the reporting circuitry provides reports is located on the corporate business network.

5. The system of claim 1, where the human-machine interface to which the reporting circuitry provides reports is located on both the plant network and the corporate business network.

6. The system of claim 1, wherein reports of discrepancies between performance of the monitored data and the predetermined baseline are presented as OPC alarms to the user at the human-machine interface on the plant network, and where the system will recognize an acknowledgment of the OPC alarms by the user.

7. A method for gauging functional specification competency of a process control system including a plant facility network and a corporate business network that are interfaced via an application security gateway, wherein the interface includes a first access control device that is configured in a MUX configuration between the corporate business network and the application security gateway, and a second access control device that is configured in a DEMUX configuration between the application security gateway and the plant facility network, the method comprising:

fetching configuration information from automation components on the plant facility network to a virtual feed instrument on the plant facility network;

packaging the configuration information in a predetermined method and in a predetermined format;

transmitting the packaged configuration information from the virtual feed instrument to interrogator circuitry within the second access control device;

consolidating the packaged configuration information, and transmitting the consolidated packaged configuration information across the application security gateway to analysis and correlation circuitry within the first access control device;

comparing performance of the consolidated packaged configuration information to a predetermined baseline; and reporting to a user discrepancies between the consolidated packaged configuration information and the predetermined baseline.

\* \* \* \* \*